United States Patent Office 3,009,457
Patented Nov. 21, 1961

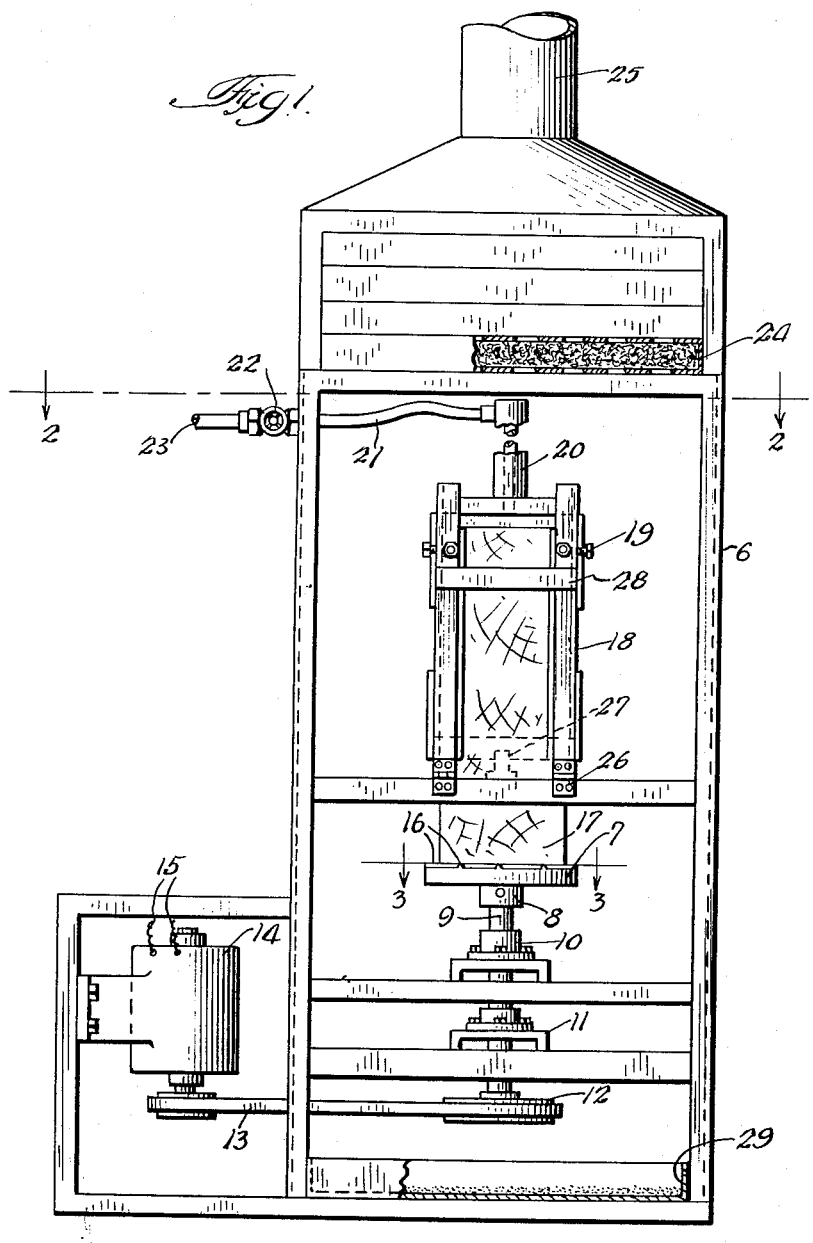

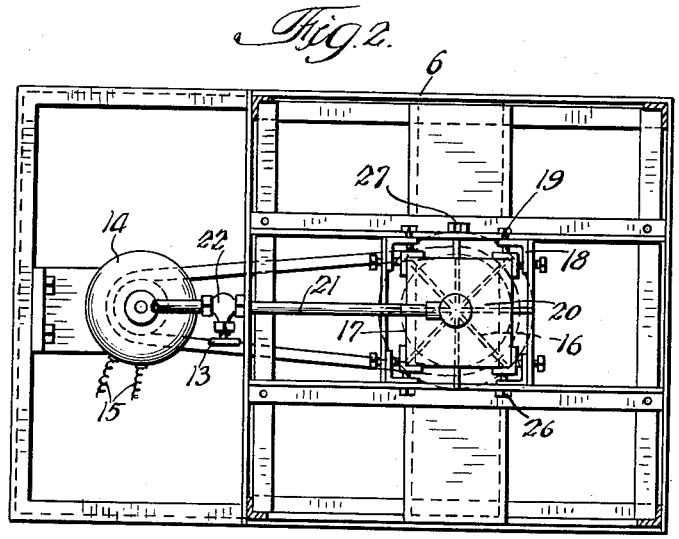
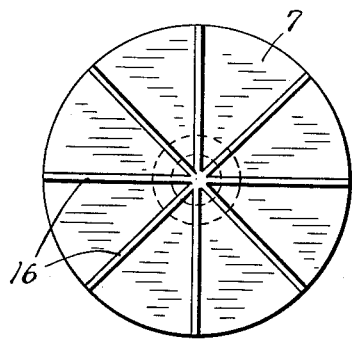
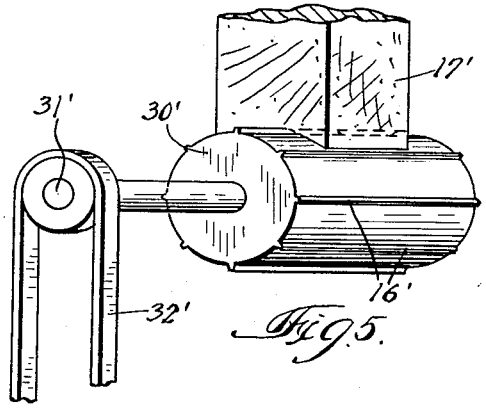
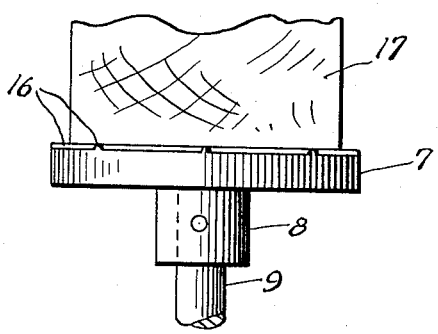

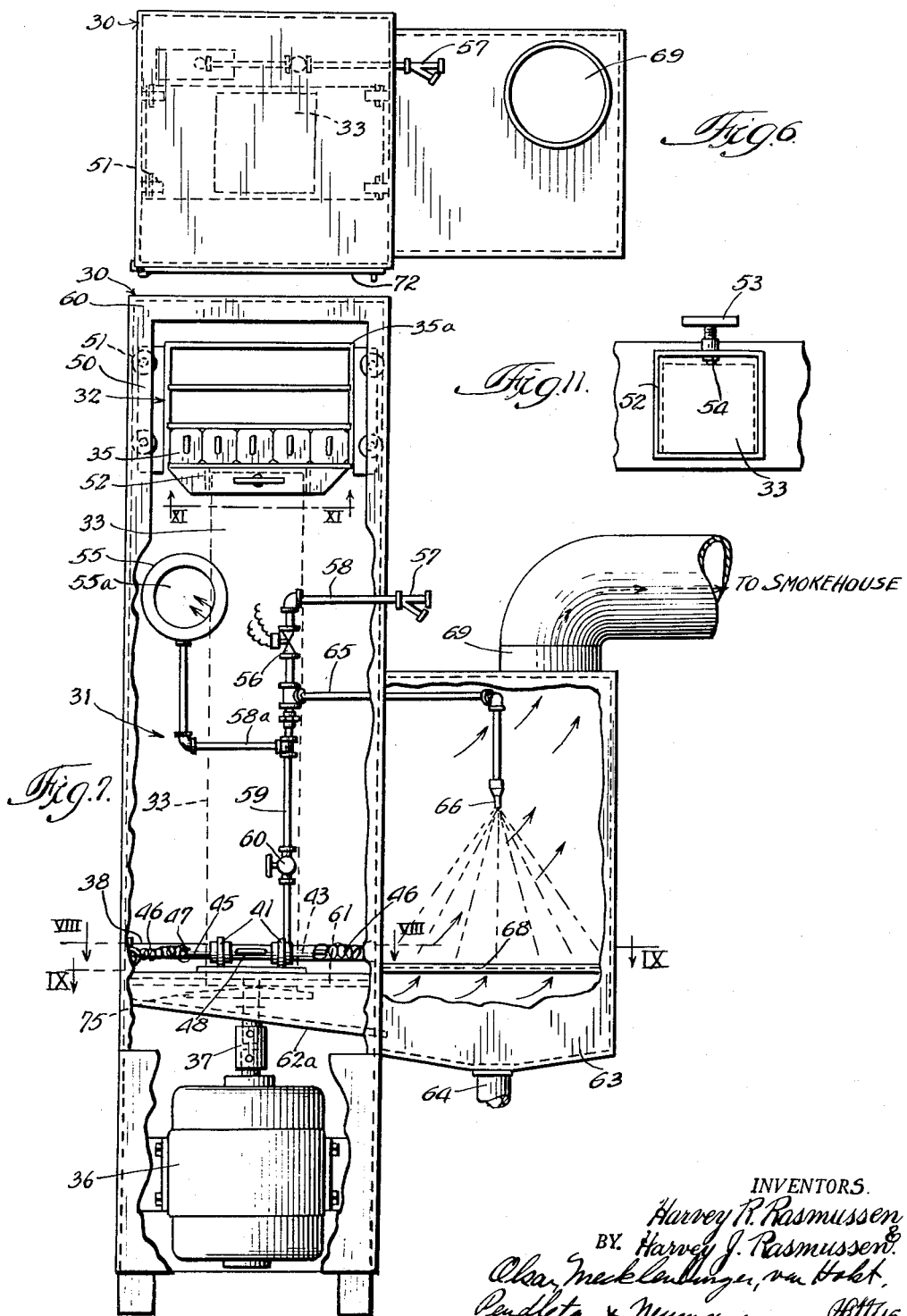

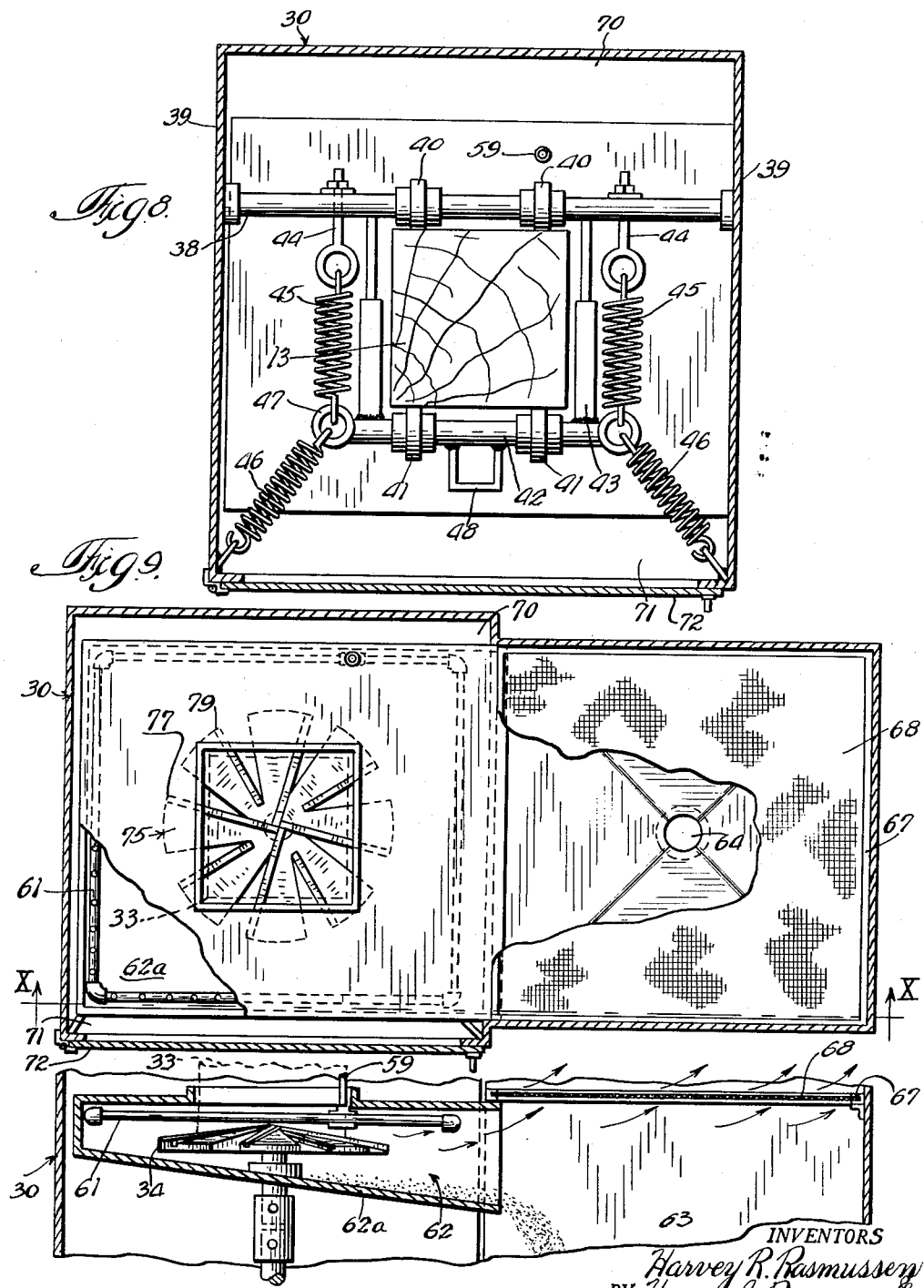

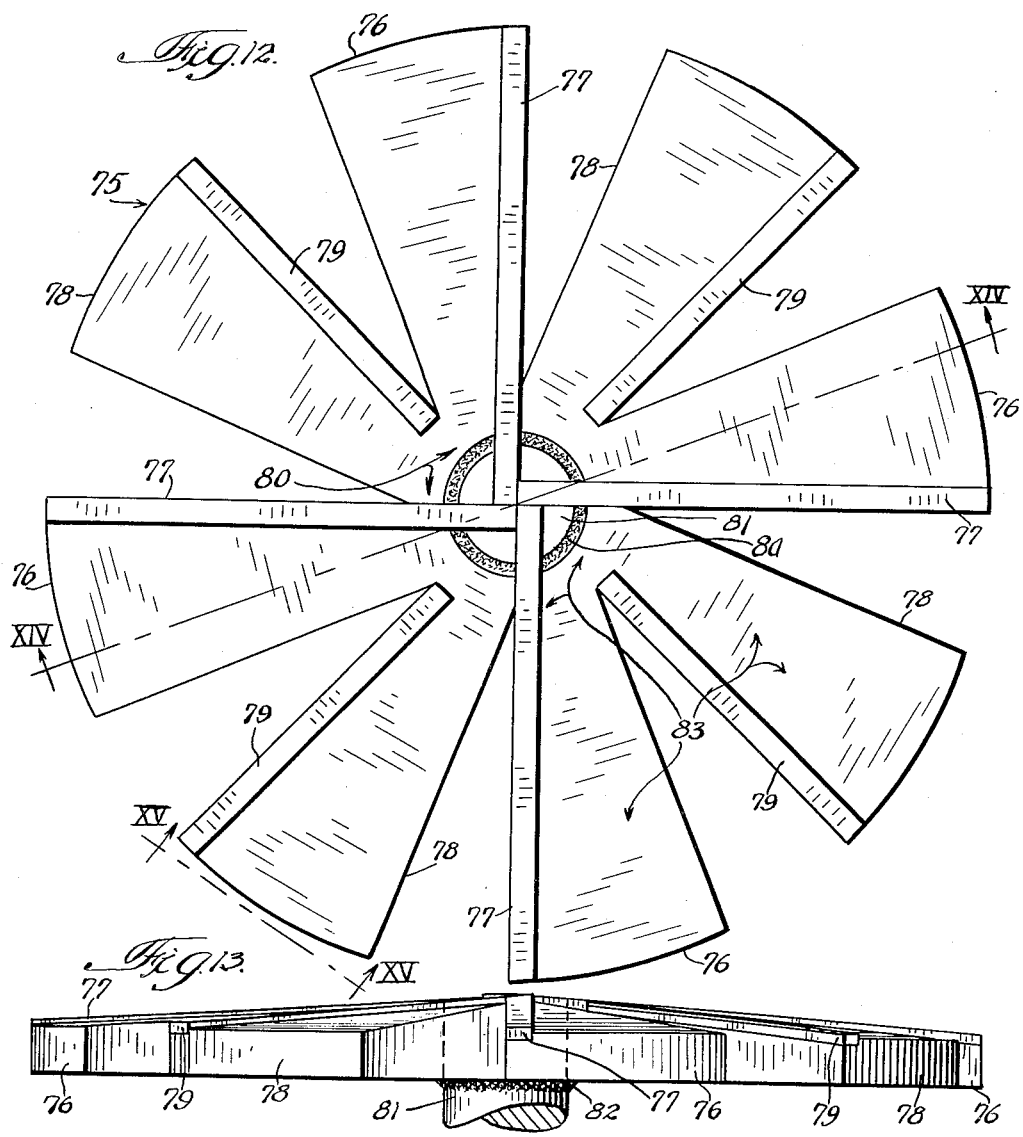
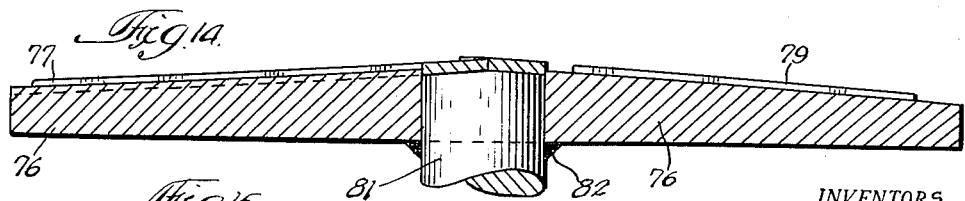

3,009,457
METHOD AND APPARATUS FOR THE PRODUCTION OF SMOKE FOR FOOD-TREATING PURPOSES
Harvey R. Rasmussen, Roselle, and Harvey J. Rasmussen, Arlington Heights, Ill., assignors, by mesne assignments, to Meat Packers Equipment Co., Oakland, Calif., a corporation of California
Filed June 9, 1958, Ser. No. 740,820
9 Claims. (Cl. 126—59.5)

This application is a continuation-in-part of the prior applications of Harvey R. Rasmussen and Harvey J. Rasmussen, Serial No. 506,053, filed May 4, 1955, entitled "Method and Apparatus for the Production of Smoke"; Serial No. 621,659, filed November 13, 1956, entitled "Frictional Smoke Generator" and Serial No. 621,655, filed November 13, 1956, entitled "Power-Operated Abrading Type End Thrust Cutter", all of which are now abandoned.

The present invention relates to an improved method and apparatus for the production of smoke such as is used in the smoking of meats and other food products. More particularly, it relates to method and apparatus for frictionally generating smoke for food treating, and it is an object of the invention to provide an improved method and apparatus of the character indicated.

The invention also relates to abrading members for use in connection with frictional smoke generating methods and apparatus, and it is an object of the invention to provide improved apparatus of this character.

It has already been proposed to create smoke for the curing of meats and the like by the burning of wood under conditions of controlled combustion for the purpose of developing a maximum amount of smoke for the minimum consumption of the fuel. Without exception, however, these methods have taken into consideration the actual burning or destructive distillation of various types of wood usually in the form of sawdust.

The present invention differs from those which have preceded it, in that the wood is not actually burned but the smoke is produced by abrading wood in such a way as to bring it to a temperature at which it will smoke rather profusely and thereafter conducting the smoke, if desired, through suitable filters into the smoke chamber or so-called smoke-house. It was surprisingly found that by this method of producing smoke the quality of the smoke could be greatly improved, and moreover the volume could also be accurately controlled.

It has been found that the smoke used in the treating of food products contains certain compounds which are responsible for the desirable color and flavor in the product treated and certain compounds which are responsible for disagreeable tastes and undesirable color. When smoke generated by the traditional sawdust-burning method is compared with smoke generated by the frictional method according to the present invention, it is found that the frictionally generated smoke contains a far greater precentage of the desirable flavor and color components. The sawdust-burning method results in a relatively uncontrolled amount of disagreeable color and flavor producing components. Accordingly, it is a further object of the invention to provide improved apparatus and method for taking advantage of the benefits of generating smoke by frictional means in treating food products.

It is a further object of the invention to provide improved means for filtering the resulting smoke so as to prevent the introduction into the smoke-house of any undesired particles or smoke constituents.

The present invention further relates to improvements which comprise positive means for filtering and washing the smoke and for extinguishing glowing particles of wood, improved means for moving the log as it is consumed, improved means for holding the wooden log, and improved means for readily changing a partially consumed log for a fresh one, and it is a further object of the invention to provide such improved apparatus.

It is a further object of the invention to provide an improved safety system for smoke generators of the character indicated wherein the apparatus is shut down if the flow of water thereto stops or decreases to a low level.

It is a further object of the invention to provide an abrading element which is free from clogging.

It is a further object of the invention to provide an abrading element which assists in holding the end of the log in place.

It is a further object of the invention to provide an abrading element which performs its function efficiently and without overheating.

Broadly speaking, the invention comprises supporting a piece of wood either vertically or horizontally and then attacking the wood by pressing the same against an abrading element made of iron or the like, of which the wood-contacting portions comprise a series of suitable corrugations or teeth so as to obtain the desired amount of smoke generation, such corrugations or teeth, for example, being provided on the surface of a supporting disc, or being provided in the form of individual members having wood-contacting surface areas similar to such corrugations.

Thus, in carrying out the invention in one form, a small portion or thin layer of the end of a log is charred by frictional force and the charred portion is removed substantially simultaneously with the charring thereof.

For a better understanding of the invention, reference should now be had to the accompanying drawings, in which FIGURE 1 is a vertical elevation of one embodiment of the preferred form of the device;

FIG. 2 is a top plan view thereof;

FIG. 3 is a plan view of a horizontally disposed abrading disc on a somewhat enlarged scale;

FIG. 4 is a view showing the abrading element in contact with the terminal end of a piece of wood, vertically disposed;

FIG. 5 shows a modification of the device wherein the abrading element comprises essentially a cylinder with corrugations on its surface;

FIG. 6 is a plan view of another embodiment of the preferred form of apparatus according to the invention;

FIG. 7 is an elevational view, partly broken away, of the apparatus shown in FIG. 6;

FIG. 8 is a view on a somewhat enlarged scale, and partly in section, taken substantially along the line VIII—VIII of FIG. 7;

FIG. 9 is a view on a somewhat enlarged scale taken substantially along line IX—IX of FIG. 7;

FIG. 10 is a view taken substantially along line X—X of FIG. 9;

FIG. 11 is a view taken substantially along line XI—XI of FIG. 7;

FIG. 12 is a plan view of an abrading element according to the invention;

FIG. 13 is a side elevational view thereof;

FIG. 14 is a sectional view taken substantially along the line XIV—XIV of FIG. 12, and FIG. 15 is an end view taken substantially along the line XV—XV of FIG. 12.

*Figs. 1–5*

As shown in FIGURE 1, the smoke producing apparatus comprises a vertically positioned housing 6 on which there are contained various instrumentalities which provide the means for carrying out the present invention. The primary smoke producing element consists of an abrading element 7, which is secured by means of a collar 8 to a suitable vertical shaft 9, which in turn passes through bearings 10 and 11, and is provided with a driving pulley 12 which is coupled by means of a suitable driving element such as a belt or chain 13 to a prime mover such as an electric motor 14, which in turn is supplied with current thorugh the wires 15.

This abrading element, as can be seen in greater detail in FIGS. 3 and 4, is a disc or base plate provided at its upper surface with radially extending protrusions 16 for the purpose of more actively attacking the end of the piece of wood 17 from which the smoke is to be generated. As shown in FIGS. 1, 3 and 4, the protrusions are relatively blunt at the area of engagement with the wood surface and have a total wood-engaging area relatively small compared to the area of the base plate.

It is to be noted that the end of the log 17 comes into contact only with the tops of the protrusions or ridges 16 which are relatively blunt so as to abrade the wood rather than to cut it. The space between the protrusions provides a place for the charred and abraded material to go, thereby not interfering with efficient operation of the structure.

The piece of wood is clamped in suitable guide pieces 18, which may be provided with set screws 19, and is so arranged that it may be gradually driven downwardly toward the abrading element 7, preferably by means of a pneumatic or hydraulic pusher element 20, the power for which is provided through the flexible tube 21 which is provided with a valve 22 and connected to a source of compressed air or hydraulic fluid through the connection 23.

It is to be understood that the arrangement is such that the wooden log may be entirely consumed by pushing it against the protrusions of abrading element 7.

At the upper part of the smoke-producing instrumentality there are provided a plurality of porous filters 24, of which there may be the desired number, to assure that the smoke is properly filtered before it is permitted to escape from the exhaust pipe or duct 25 to the smokehouse.

Now, it will be immediately apparent that the position of the filters 24 above the top of the housing can be altered; in other words, it is to be understood that if room does not permit, the smoke may be allowed to escape from the chamber in a lateral direction, but this is not illustrated as it is an obvious expedient, well within the skill of the art.

In order to hold the piece of wood 17 in place, there are provided laterally and vertically extending guide pieces 18. The guide pieces 18 are controlled by means of set screws 19, and are so arranged that the guide pieces may be swung horizontally forward of the hinges 26 and then upwardly so as to be kept in place by means of a hook 27 so as to permit the insertion of a fresh piece of wood whenever the original one is exhausted. As already mentioned, the pressure by means of the hydraulic ram 20 will serve eventually to push the wood substantially completely against the abrading disc 7. The guide pieces 18 are also connected with each other by means of the transversely extending pieces 28.

In actual operation, the member 7 is operated at a high enough speed to generate a charring temperature so as to cause the development of large volumes of the desired smoke.

The bottom of the housing may be provided with a suitable ash pit 29 from which any unburned pieces of wood which fall down into it may be removed periodically.

It is of course axiomatic that to generate smoke of the desired character, that portion of log which is smoking must be raised to the smoking temperature. The temperature should not be so high or maintained for so long a time that flaming takes place or that undesirable smoke components are formed. According to the teachings of the subject invention, only those portions of the log which are in contact with the protrusions 16 are raised to the smoking temperature. The remaining portions of the end of the log, that is, those portions which are in between the protrusions 16 are not at the smoking temperature and therefore do not produce any smoke. The abrading member 7 has a substantial mass and therefore heat capacity, and it remains essentially cool—that is, substantially below the combustion temperature of the wood, and it thereby assists in maintaining the major portion of the end of the log below the smoking temperature.

In view of the fact that the surface area of the protrusions is relatively small compared to the surface area of the end of the log or the general planar area of the abrading element, the stress at the point of engagement between the protrusions 16 and the end of the log is very high and therefore as these protrusions move past a particular portion of the end of the log, a high temperature is substantially instantaneously created and that portion of the end of the log in contact with a protrusion reaches combustion temperature and smoke is generated. However, immediately behind the point of engagement of the protrusions 16 and the end of the log 17 there is no stress and the temperature thereat is far below the combustion temperature and no smoke is produced in this area. Accordingly, portions of the log reach the combustion or smoking temperature rapidly and are at such temperature for a very short interval of time only, and the resultant smoke generated is therefore cool and of good quality for flavor and color. Moreover, since the major portion of the end of the log remains cool or below the combustion temperature, there is less time for the undesirable components of the smoke to be generated. That is to say, it has been found desirable to heat only that portion of the log at which combustion or smoking is taking place to the combustion temperature and to allow the remainder of the log to remain below combustion temperature.

The portion of the log in contact with protrusions 16 is charred in the smoking process by which the desired components are driven out in the smoke and in order for the protrusions 16 to have fresh wood to work against, it is desirable that the protrusions serve to remove the charred portion of the end of the log substantially at the instant of charring. That is to say, for the continuous and efficient production of smoke it is necessary that the charred portions of the log be removed. Thus, it has been found when a smooth flat disc is used without any provision for the removal of the charred end of the log, smoke will not be generated on a continuous basis. Smoke will be generated only until the end of the log is charred and thereafter only heat will be generated which, if the process is continued for a sufficient length of time, will result in flaming.

As shown in FIG. 5, an alternative method is illustrated in which the piece of wood 17' is allowed to impinge laterally against a horizontally rotating drum 30' which is supported in suitable bearings 31' (only one is shown in the drawing) and which is driven over a pulley by means of the belt 32'. Just as in the case of the element 7, the cylindrical drum 30' is provided with longitudinally extending protuberances 16' which serve the same function of acting upon the piece of wood 17' so as to heat it and generate smoke therefrom.

Of course it will be obvious that means must be provided for moving the piece of wood down against the periphery of the drum 30' for which purpose the same type of hydraulic pushing means shown in connection with the drawing of FIGS. 1 and 2 may be provided.

The invention is not to be circumscribed to any particular type of wood, as all types are suitable, but it is preferred to use some type of hardwood, as the smoke therefrom has more desirable properties.

Figs. 6–11

In these figures of the drawings there is shown a smoke generator comprising a housing 30 including main smoke-producing element 31, which comprises means 32 for holding a wooden log 33 and an abrading element 34.

The log 33 is forced downwardly by weights 35 which may consist of metal bars and is directed against the abrading member 34 driven by an electric motor 36, for example, to which it is directly coupled by the coupling 37. The smoke is formed at the abrading member and flows out through chambers 63 and 67 and outlet 69 to a smoke-house.

The means employed for holding the lower portions of the log are shown in detail in FIG. 8 and comprise a resilient arrangement whereby the lower end of the log may be held sufficiently firmly and yet be allowed some movement as the nature of the wood requires. A transverse shaft 38 firmly affixed to two opposite walls 39 of the housing 30 includes one or more rollers 40 which bear against the rear side of the log 33. Bearing on the opposite side of the log there are similar rollers 41 mounted on the shaft 42. Extensions 43 rigidly attached to shaft 42 project along the two other sides of the log 33 to keep it laterally in line. Secured to the shaft 38 are ring bolts to which, in turn, are secured helical springs 45 which are fastened at one end to the ring bolts 44 and at the other end to rings 47 which are attached to the shaft 42. Obliquely positioned helical springs 46 are fastened at one of their ends to the rings 47 while the outer ends of the springs are secured to the adjacent corners of the housing 30. The force of the springs 45 is greater than that of the springs 46 and hence the log 33 is movably secured between the rollers 40 and 41. A handle 48 is provided so that the log may be freed. By grasping said handle and prying the shaft 42 forward, the rollers 41 are removed from the log, whereafter it can readily be displaced. Upon the insertion of a fresh log, the shaft 42 with its attached rollers 41 are allowed to spring back into place, thus holding the new log.

As already mentioned above, metallic weights 35 arrangeable in rows are applied to the top of the log, and these weights ride down with the log on a carrier 50 which is guided by rollers 51. The weights 35 are held in a rack 35a to the bottom of which a yoke 52 is attached, the combined unit being guided by the idlers 51. The upper end of the log is secured by the yoke 52 which is traversed by a holding screw 53, the end 54 of which is permitted to dig into the log 33 (see FIG. 11).

As the log is forced downwardly under the influence of the weights 35 and the abrading element 34 is actuated by the motor 36, there will ensue a constant development of the desired smoke. The log may be made of hickory wood, as this produces a very desirable type of smoke.

It has been found that weights provide improved results so far as forcing the log down is concerned, as compared with more positive means, inasmuch as the number of weights is easily regulated and the rate of feeding automatically adjusts itself to variations in the hardness of the wood. The density of the smoke desired and the amount of smoke needed determine the rate of log feed and thus the number of weights used. Accurate control may be maintained since weights in small units may be added or removed.

For extinguishing glowing particles of wood, for removing such extinguished particles from the abrading chamber 62, and for washing the smoke to remove additional impurities and to cool it, a water system interlocked with the driving motor is provided and functions as follows:

A pressure type of safety switch 55 (see FIG. 7) is so constructed that it will serve to connect the motor 36 and the actuating coil of the magnetic water valve 56 to a source of electricity through circuits, not shown, when the switch button 55a is depressed manually. Thereupon, the motor 36 starts and simultaneously the magnetic water valve 56 is opened to permit flow of water from a source 57 into the piping system. Water will hence flow through the pipes 58 and 59 and the valve 60 to a perforated pipe 61 through which a spray of water will be discharged upwardly wherewith to quench any glowing particles that may be thrown off the lower end of the log 33. The discharged water will thence flow along the downwardly sloping bottom 62a into the pit 63 from which it may eventually be discharged through a suitable opening 64.

At the same time water will also flow through the pipe 65 to a downwardly facing spray nozzle 66 which is located in the chamber 67 into which the smoke enters through a filtering element 68 to rise upwardly therein and to escape through opening 69 to be thereby delivered to the smoke-house (not shown).

The switch 55 is connected to the water system by pipe 58a and may be a commercially available pressure-sensitive switch, so that as long as the water pressure is maintained in pipe 58a, the switch remains closed and the circuits operative—that is, the motor 36 runs and the valve 56 remains open. However, when the pressure falls below a predetermined value, the switch opens and the circuits become inoperative. That is, the motor 36 stops and simultaneously the valve 56 closes and the water sprays stop. Accordingly, it is evident that when water pressure falls to such a level that particle-removal and smoke-washing may be inadequate, the system ceases operation. Manual re-starting of the apparatus becomes necessary and is effective only if the water pressure has been restored.

The abrading element 75 is preferably constructed of metal and has tungsten carbide abrading members 77 and 79 suitably secured thereto, as by welding, brazing or a sufficiently high-melting solder.

The abrading element 75 is interiorly of abrading chamber 62 as is the perforated pipe 61. The abrading chamber is partly enclosed on all but the right-hand side which is open and communicates with pit 63. It includes openings at the top for receiving the lower end of the log, and at the bottom for receiving the driving shaft of the abrading element. The abrading chamber is spaced at the front and rear from the walls of the smoke generator to provide openings 70 and 71, as may be seen in FIGS. 8 and 9, through which the incoming air is received. In its passage into the generator, the incoming air cools the driving motor.

In commercial operation the abrading element 34 is usually driven at about 1400 r.p.m., at which speed the amount of friction is such that smoke development starts about from three to five seconds after setting the apparatus in motion.

Smoke-houses are usually provided with means for pulling smoke into them and circulating it therein so that all parts of the meat being smoked will be treated equally. Accordingly, no such parts are shown. The smoke produced by the apparatus of the present invention is drawn by circulating fans or their equivalents into the smoke-house from the duct 69. This provides enough draft to pull the smoke from the abraded log through the filter 68 and through the water spray coming from nozzle 66.

The housing 30 may be made of sheet material such as stainless steel placed on a suitable framework, a door 72 being provided for access to the interior for changing logs, cleaning, etc.

The present invention has proven to be eminently practical and useful, and is being adopted by numerous concerns which smoke meats and meat products, such as sausages and the like. Smoke is generated easily so that a smoke-house may be filled with smoke in less than four minutes after setting the abrading member into motion.

The present invention dispenses with the use of sawdust for providing smoke, and thus eliminates the fire hazard resulting from the storage thereof; and also saves much time and labor such as is usually expended in preparation for firing up the sawdust burners after a week-end shutdown. Moreover, it provides a much more convenient source of smoke and enables the more accurate control of its volume and desired density.

*Figs. 12–15*

In these figures of the drawings the abrading element 75 also shown in FIGURES 6-10, inclusive, consists of a flatly conical piece of metal, preferably steel or iron, divided into a number of radially extending segments or vanes spatially separated, and which are provided with raised abrading portions at their leading edges.

As shown in FIG. 12, there may be, for example, eight such vanes. Four of the vanes 76 carry such abrading portions 77 all the way to the hub or center of the device, while the other four vanes 78 carry the abrading portions 79 substantially to the center but terminating short thereof at the inner ends of the vanes. All of the vanes extend from a hub-like portion 80 having sufficient strength to maintain the strength and rigidity of the abrading element during use.

The abrading portions or edges 77 and 79 which preferably may be of tungsten carbide alloy pieces, are shown attached to the vanes 76 and 78, respectively, by welding, brazing, or, preferably, by a high-melting point silver solder. While separate abrading pieces are shown, it will be understood that other forms of abrading edges may be used, for example, edges integrally formed with the material of the vanes.

The entire disc is securely fastened to a shaft 81 which projects through a central opening in the disc by silver soldering, for example, at 82. As shown best in FIG. 12, the end of shaft 81 projects through to the upper edge of the conical surface 83 of the disc 75 and is soldered thereto at 84 for greater strength and rigidity.

The reasons for making the edge portions 77 and 79 from tungsten carbide is to make them sufficiently durable so that the abrasion of wooden logs may be carried out for a relatively long time without necessitating replacement of the disc.

As will be seen best in FIG. 15, the abrading edge 79 extends part way into the steel vanes 78, but also extends above the general plane thereof, because it is the abrading edges which are mainly relied upon to abrade the wood. Similarly for the abrading edges 77 and vanes 76. While tungsten carbide has been found to be a satisfactory material, it will be understood that other hard and durable materials may be used.

In the use of the device according to the invention, the end of a log is forced against the abrading element 75 which is rotated, the force being enough so that the end of the log is abraded away and smoke is created. The slightly conical configuration of the disc causes the end of the log to acquire a slightly conical or tapering hole whereby the log is centered and so tends to remain in place easier without tending to jump off the abrading element. The abrading edges 77 and 79 project above the general plane of the disc so that abrading may take place easier, the abrading stress appearing only at the abrading edges instead of over the complete surface of the vanes. Moreover, the space behind the cutting edges forms a space for receiving the particles before they fall-off into the spaces between the vanes. These particles, therefore, are not chewed over and over, and the work necessary to abrade the wood is reduced, and the abrading process proceeds better. This latter benefit is enhanced by the spaces between the vanes, since the particles fall off the disc completely and may be carried away. The vanes, of course, must be sufficiently strong to take the necessary stresses.

Obvious modifications are intended to be included in the scope of the invention—for example, the number of the vanes and the general shape thereof.

In the form of abrading member shown in FIGS. 12–15, the abrading edges 77 and 79 are relatively blunt and have a small abrading surface area compared to the general area of the abrading element 75. The small surface of edges 77 and 79 results, during use, of a high local stress and consequent smoke generation without heating the portions of the log not in contact with the edges. Here also the abrading edges remove the charred wood portions substantially simultaneously with the charring thereof. The charred and removed material spreads into the space behind the edges 77 and 79 and ultimately falls away.

It is the abrading edges or members or abrading protrusions which are the important components since these do the actual work desired and not the base supporting them.

The base may be open between the abrading edges, members, or protrusions, and the like, or closed as by plates. The base must be rigid so as to fully support the abrading members.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. In a frictional smoke generator for use in the smoking of meats or the like, the combination comprising a housing, an abrading element in said housing, means contained in said housing for supporting a wooden log and for forcing it against said abrading element, means for rotating said abrading element against the end of said log; means for conducting water into said housing near the lower end thereof whereby to extinguish glowing particles produced as the result of the abrasion, and washing the same from the lower end of said housing; control means coupled between the water conducting means and the means for rotating said abrading element in such manner that upon failure of the water supply the rotation of said abrading element will cease.

2. In a frictional smoke producer for use in the smoking of meats or the like, the combination comprising a housing, an abrading element in said housing, means in said housing for vertically retaining a wooden log and weight means for forcing said log against said rotating abrading element, means for rotating said element with force sufficient to effect combustion of said log with resulting formation of smoke, a water supply system for conducting water to said housing and for spraying the same in the vicinity of the lower portions of said log whereby to extinguish glowing particles thrown off by the abrading element and for also spraying water into the resulting smoke, and switch means responsive to the pressure of said water supply system being so connected with the means for rotating the abrading element whereby upon the dropping of the pressure in said water supply system, said switch means will de-energize said means for rotating the abrading element and the rotation of said abrading element will stop.

3. In a frictional smoke generator for use in the smoking of meats or the like, the combination comprising a housing, means guided within said housing for forcing a log or similar member along a path, an abrading station disposed at the end of such path containing means for abrading one end portion of such log or the like whereby smoke is generated, means in communication with said abrading station for conveying said generated smoke therefrom, water spray means disposed in said communicating means whereby said smoke conveyed from said abrading station may be washed in the course of passing therethrough, control means for said abrading means sensitive to the water pressure in said water spray means whereby said abrading means ceases to operate when the pressure in said water spray means falls below a predetermined minimum.

4. In a frictional smoke generator for use in smoking meats or the like, the combination comprising a housing, means guided within said housing for forcing a log or similar member along a path, an abrading station disposed at the end of said path containing means for abrading one end portion of such log or the like whereby smoke is generated, first means for spraying water about the interior periphery of said abrading station whereby any burning embers produced in said abrading station and tending to leave said station are quickly extinguished, means in communication with said abrading station for conveying said generated smoke therefrom, and second water spray means disposed in said communicating means for washing the smoke conveyed from said abrading station.

5. In a frictional smoke generator for use in the smoking of meats or the like, the combination comprising a housing, means guided by portions of said housing for reciprocally moving in a substantially vertical plane therein, said guided means engaging the top portion of a log or the like and forcing the same along a vertical path, weight means engageable with said guided means whereby the downward force exerted on said log or the like may be varied, means for abrading the bottom end portion of such log or the like arranged at the end of said path whereby smoke may be generated, spray means arranged about said abrading means for extinguishing any embers generated thereby and means disposed adjacent said abrading means for engaging the lower portion of said log or the like and guiding the same against said abrading means, said log engaging means including means to allow the engaged log or the like to be released as desired, magnetically operable valve means regulating the admission of water to said spray means, means sensitive to the water pressure in said spray means regulating said valve means and said abrading means whereby said valve means is closed and said abrading means is stopped when the pressure of the water flowing to the spray means falls below a predetermined minimum.

6. An abrading element for engaging wooden articles in frictional smoke-making machines comprising a conical base member divided into a number of radial members which join at a base central portion, a series of radially extending abrading members disposed on the conical surface of said base, each of said abrading members having a planar abrading surface area for engaging such wooden articles to be abraded in the normal course of producing smoke, each of said abrading members being arranged along an edge of one of said base member radial members.

7. The abrading element recited in claim 6 in which said abrading members are arranged on only one edge of each of said radial members and said abrading members are arranged along every other edge of said radial members.

8. The method of generating smoke for food-treating purposes comprising the steps of providing a solid piece of wood in a smoke-generating zone; applying to individual areas of an end of said solid piece of wood while in said smoke-generating zone, which individual areas are small compared to the total surface area of said end of said solid piece of wood, a frictional force sufficiently high to substantially instantaneously raise the temperature of said areas to combustion temperature, said frictional force being applied for a period sufficient to cause charring without flaming at said individual areas with accompanying production of smoke, while the temperature of the surface areas of said end of said solid piece of wood which are not subject to said frictional force are below combustion temperature; substantially simultaneously removing charred portions of said end of said solid piece of wood; and conducting the smoke so produced from said smoke-generating zone.

9. Apparatus for producing food-treating smoke from the consumption by charring of a solid piece of wood comprising a housing; an abrading element supported within said housing, said abrading element including a substantially-rigid base member and a series of substantially-rigid protuberances thereon having relatively-blunt, wood-contacting portions, the wood-contacting portions of said protuberances having a small surface area compared to the area of said base member; means within said housing for guiding such solid piece of wood to move endwise so as to contact said abrading element; means associated with said guiding means for forcing said solid piece of wood endwise against said wood contacting portions; means operatively connected to said abrading element for rotating said abrading element when such piece of wood is forced by said forcing means against said wood contacting portions with sufficient force to cause the interengagement of said wood contacting portions with said piece of wood during such rotation to char without flaming those portions of the wood in engagement with said wood contacting portions with resultant production of smoke and to substantially simultaneously remove such charred portions; and means in communication with said housing for educting smoke produced therein.

References Cited in the file of this patent

UNITED STATES PATENTS

| | | |
|---|---|---|
| 321,007 | Chapin | June 30, 1885 |
| 351,285 | Ritchie | Oct. 19, 1886 |
| 528,664 | Folin | Nov. 6, 1894 |
| 1,094,361 | Blevney | Apr. 21, 1914 |
| 1,446,194 | McCullough | Feb. 20, 1923 |
| 2,028,080 | Stern | Jan. 14, 1936 |
| 2,217,282 | Lewis | Oct. 8, 1940 |
| 2,266,131 | Thon | Dec. 16, 1941 |
| 2,422,024 | Levey et al. | June 10, 1947 |
| 2,546,964 | Blackford et al. | Apr. 3, 1951 |
| 2,640,414 | Jensen | June 2, 1953 |
| 2,655,319 | Johnson | Oct. 13, 1953 |
| 2,667,157 | Vastola | Jan. 26, 1954 |
| 2,682,375 | Johnson | June 29, 1954 |

FOREIGN PATENTS

| | | |
|---|---|---|
| 12,199 | Norway | Sept. 14, 1903 |